US011301024B2

(12) United States Patent
Oakley et al.

(10) Patent No.: US 11,301,024 B2
(45) Date of Patent: Apr. 12, 2022

(54) SYSTEM AND METHODS FOR DETECTING AND MONITORING POWER CHARACTERISTICS AMONGST CONNECTED DEVICES IN A CONFERENCING SYSTEM

(71) Applicant: Shure Acquisition Holdings, Inc., Niles, IL (US)

(72) Inventors: William J. Oakley, Grayslake, IL (US); Michael Iversen, Valby (DK); Christopher Meyer, Libertyville, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 251 days.

(21) Appl. No.: 15/886,579

(22) Filed: Feb. 1, 2018

(65) Prior Publication Data

US 2018/0224920 A1  Aug. 9, 2018

Related U.S. Application Data

(60) Provisional application No. 62/454,508, filed on Feb. 3, 2017.

(51) Int. Cl.
*G06F 1/3234* (2019.01)
*H04L 12/18* (2006.01)
(Continued)

(52) U.S. Cl.
CPC ............ *G06F 1/3234* (2013.01); *G06F 1/266* (2013.01); *H04L 12/10* (2013.01); *H04L 12/12* (2013.01);
(Continued)

(58) Field of Classification Search
CPC ....... G06F 1/3234; G06F 1/266; H04L 12/10; H04L 12/12; H04L 12/1822; H04L 12/1831; H04L 12/40039; H04L 12/40045
See application file for complete search history.

(56) References Cited

U.S. PATENT DOCUMENTS 5,200,743 A  4/1993 St Martin
5,844,327 A  12/1998 Batson
(Continued)

FOREIGN PATENT DOCUMENTS

CN  104967524  10/2015
EP    0745920  12/1996
(Continued)

OTHER PUBLICATIONS

International Search Report and Written Opinion for PCT/US2018/016489 dated Apr. 5, 2018.
(Continued)

*Primary Examiner* — Philip J Chea
*Assistant Examiner* — Robert B McAdams
(74) *Attorney, Agent, or Firm* — Neal, Gerber & Eisenberg LLP

(57) ABSTRACT

System and methods for detecting and monitoring power characteristics amongst connected devices in a multi-device system, such as a conferencing system, are disclosed. The system and methods sense power characteristics at various points within the system, such as at ports of the host and client devices. The hosts and client devices can include control units and conferencing units (e.g., microphones) in conferencing applications. The power characteristics can be communicated to the host device for further treatment, such as monitoring, processing and outputting data to allow determination of conditions associated with the power distribution of the system.

32 Claims, 3 Drawing Sheets

(51) Int. Cl.

| | |
|---|---|
| *H04N 7/15* | (2006.01) |
| *H04L 65/65* | (2022.01) |
| *H04L 12/40* | (2006.01) |
| *H04L 65/403* | (2022.01) |
| *H04N 21/218* | (2011.01) |
| *H04L 12/12* | (2006.01) |
| *H04L 12/46* | (2006.01) |
| *H04L 43/065* | (2022.01) |
| *G06F 1/26* | (2006.01) |
| *H04L 12/10* | (2006.01) |
| *H04L 43/08* | (2022.01) |

(52) U.S. Cl.
CPC ...... *H04L 12/1822* (2013.01); *H04L 12/1831* (2013.01); *H04L 12/40039* (2013.01); *H04L 12/40045* (2013.01); *H04L 12/4625* (2013.01); *H04L 29/06517* (2013.01); *H04L 43/065* (2013.01); *H04L 43/08* (2013.01); *H04L 65/403* (2013.01); *H04N 7/155* (2013.01); *H04N 21/21805* (2013.01)

(56) References Cited

U.S. PATENT DOCUMENTS

| | | | |
|---|---|---|---|
| 5,936,318 A | 8/1999 | Weiler | |
| 6,341,054 B1 | 1/2002 | Walder | |
| 6,701,443 B1* | 3/2004 | Bell | G06F 1/266 700/22 |
| 6,762,675 B1* | 7/2004 | Cafiero | G06F 1/266 340/10.42 |
| 7,089,089 B2 | 8/2006 | Cumming | |
| 7,240,224 B1* | 7/2007 | Biederman | G06F 1/266 713/300 |
| 7,613,939 B2* | 11/2009 | Karam | H04L 12/10 702/60 |
| 7,835,295 B2 | 11/2010 | Brewer | |
| 7,859,405 B2 | 12/2010 | Tang | |
| 7,902,966 B1 | 3/2011 | Beitelmal | |
| 8,140,276 B2 | 3/2012 | Walters | |
| 8,617,754 B2 | 12/2013 | Edmiston | |
| 8,674,676 B2 | 3/2014 | Koizumi | |
| 8,674,843 B2 | 3/2014 | Bhageria | |
| 8,700,187 B2 | 4/2014 | Forbes, Jr. | |
| 8,708,722 B1 | 4/2014 | Walliser | |
| 8,843,075 B2 | 9/2014 | Kenkel | |
| 8,917,590 B2* | 12/2014 | Cazanas | H04M 3/563 370/216 |
| 9,019,885 B2 | 4/2015 | Marco | |
| 9,164,560 B2 | 10/2015 | Templeton | |
| 2004/0230846 A1* | 11/2004 | Mancey | H04L 12/40045 713/300 |
| 2008/0024605 A1* | 1/2008 | Osann, Jr. | G08B 13/00 348/143 |
| 2009/0100274 A1* | 4/2009 | Diab | H04L 12/10 713/300 |
| 2012/0185718 A1 | 7/2012 | Miyoshi | |
| 2012/0293605 A1* | 11/2012 | Seferian | H04N 7/147 348/14.08 |
| 2013/0238266 A1 | 9/2013 | Savvides | |
| 2015/0378428 A1* | 12/2015 | Selvarajan | G06F 1/3218 713/323 |
| 2016/0099567 A1 | 4/2016 | Sun | |
| 2016/0132089 A1 | 5/2016 | Tenca | |
| 2016/0380475 A1 | 12/2016 | Yang | |

FOREIGN PATENT DOCUMENTS

| | | |
|---|---|---|
| EP | 2005275 | 12/2008 |
| EP | 2228943 | 9/2010 |
| GB | 2442304 | 4/2008 |
| JP | 2006339985 | 12/2006 |
| WO | 2007106795 | 9/2007 |

OTHER PUBLICATIONS

Energy Monitoring and Power Saving Solutions for Business, Green Running, Nov. 15, 2013, https://web.archive.org/web/20131115051948/http:/greenrunning.com/products/, retrieved Aug. 10, 2018.

\* cited by examiner

SYSTEM AND METHODS FOR DETECTING AND MONITORING POWER CHARACTERISTICS AMONGST CONNECTED DEVICES IN A CONFERENCING SYSTEM

CROSS-REFERENCE TO RELATED APPLICATION

This application claims the benefit of U.S. Provisional Patent Application No. 62/454,508, filed on Feb. 3, 2017, the contents of which are incorporated herein in their entirety.

TECHNICAL FIELD

This application generally relates to power management amongst a plurality of connected devices in a system, such as microphones used in a conferencing system. In particular, this application relates to systems and methods for detecting and monitoring power characteristics amongst connected devices in a conferencing system.

BACKGROUND

In certain systems, a plurality of connected devices may be deployed and scalable depending on requirements. For example, in conferencing environments, such as boardrooms, conferencing settings, and the like, conferencing systems that include a plurality of conferencing units or devices, such as microphones for capturing sound from audio sources and loudspeakers for presenting audio from a remote location, may be deployed and scaled depending on the conference environment requirements. The conferencing units are typically connected to one or more host units/devices, or control units/devices that act as the control entity for the plurality of devices deployed in the system, which may be deployed in multiple chains of devices in serial connection. To provide scalability and adaptability, additional conferencing units may be connected within such a system depending on functional requirements. Such scalability and adaptability, however, can present challenges to the system and its integrator.

For example, when additional conferencing units are added to an existing system on an ad hoc basis, it is difficult to determine whether the system's power requirements are sufficient to handle such additions without trial and error. This can be time consuming and inefficient, especially when scalability is often required at the last minute, or specialized personnel are not available. Furthermore, it is difficult to troubleshoot power issues within such systems, particularly in deployments of large numbers of conferencing units in multiple chains. Again, it is difficult to detect a bad unit or a faulty cable in a chain of units without significant trial and error.

Accordingly, there is a need for a system and methods directed to solving these and other problems.

SUMMARY

The invention is intended to, among other things, solve the above-noted problems by providing a system and methods for detecting and monitoring power characteristics amongst connected devices in a multi-device system, such as a conferencing system. The system and methods sense power characteristics at various points within the system, such as at ports of the host and client devices, such as control units and conferencing units (e.g., microphones) in conferencing applications, which can be communicated to the host device for further treatment, such as monitoring, processing and outputting data to allow determination of conditions associated with the power distribution of the system.

In an embodiment, a conferencing system comprises a control unit having a data bus, a power bus, an output port in communication with the power bus, and a sensor in communication with the output port, which is capable of sensing one or more power characteristics at the output port. The system further comprises a first conferencing unit in communication with the data bus of the control unit. The first conferencing unit has an input port in communication with the power bus via connection to the output port of the control unit, an output port in communication with the power bus, and a sensor in communication with the output port of the first conferencing unit, which is capable of sensing one or more power characteristics at the output port of the first conferencing unit. Data associated with the sensed power characteristics at the output port of the first conferencing unit is capable of being communicated over the data bus to the control unit.

In another embodiment, the system further comprises a second conferencing unit in communication with the data bus of the control unit. The second conferencing unit has an input port in communication with the power bus via connection to the output port of the first conferencing unit, an output port in communication with the power bus, and a sensor in communication with the output port of the second conferencing unit, which is capable of sensing one or more power characteristics at the output port of the second conferencing unit. Data associated with the sensed power characteristics at the output port of the second conferencing unit is capable of being communicated over the data bus to the control unit.

In yet another embodiment, a conferencing system comprises a control unit having a data bus, a power bus, an output port in communication with the power bus, and a sensor in communication with the output port, which is capable of sensing one or more power characteristics at the output port. The system further comprises a plurality of conferencing units each in communication with the data bus and each comprising an input port and an output port in communication with the power bus. Each input port is in communication with the power bus via connection to either one of the output port of the control unit or the output port of another one of the plurality of conferencing units. Each of the plurality of conferencing units further comprise a sensor in communication with the output port of the conferencing unit capable of sensing one or more power characteristics at the output port of the conferencing unit. Data associated with the sensed power characteristics at each of the respective output ports of the plurality of conferencing units are capable of being communicated over the data bus to the control unit.

These and other embodiments, and various permutations, aspects and applications, will become apparent and be more fully understood from the following detailed description and accompanying drawings, which set forth illustrative embodiments that are indicative of the various ways in which the principles of the invention may be employed.

DETAILED DESCRIPTION

Figure 1:
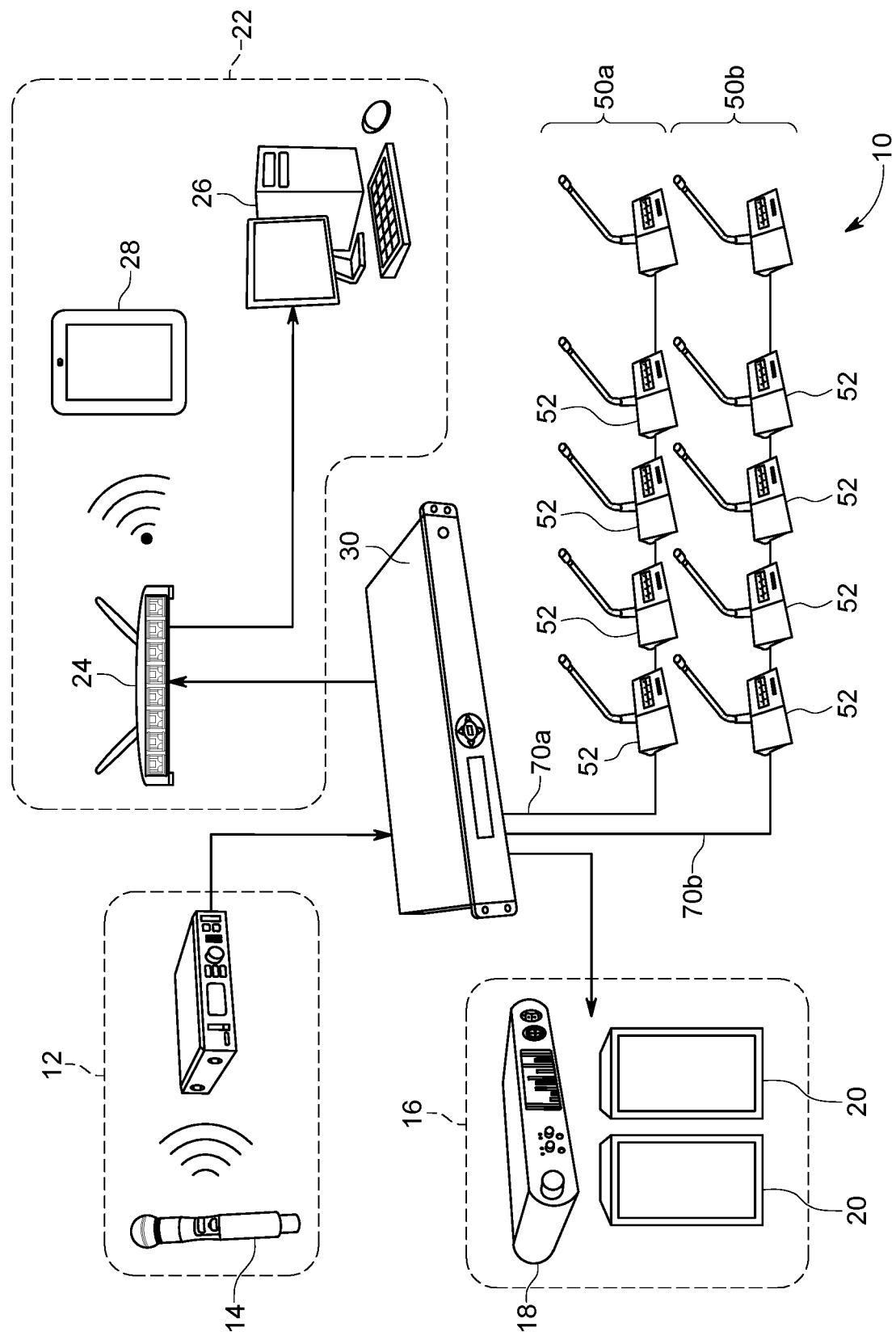
FIG. 1 is a diagram of a communication system including a control unit and various conferencing units and other peripherals, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Turning to FIG. 1, a conferencing system 10 according to an embodiment of the present invention is depicted. The conferencing system 10 includes a control unit 30 that is described in greater detail with reference to FIGS. 2A, 2B and 3. In some embodiments, the control unit 30 acts as a central controller of the conferencing system 10, as described herein. The control unit 30 is in communication with one or more audio inputs 12, which may include devices such as a microphone 14 (which may be a wired microphone, or a wireless microphone system). The audio inputs 12 may comprise other devices, such as digital audio players, cassette tapes, audio visual sources, and other devices capable of producing and/or transmitting sounds and audio signals. The control unit 30 is further in communication with one or more audio outputs 16, such as an amplifier 18 and one or more loudspeakers 20. The audio outputs 16 serve to receive audio signals from the conferencing system 10 (either directly or as further processed by the system 10), and transmit such audio to recipients of the content carried on the system 10. Thus, the recipients may be individuals located proximate the system 10, for example, listeners hearing audio over loudspeakers in a room where the system is installed 10. Alternatively, the recipients may be remote from the system 10, such as listeners and participants in a remote location hearing a transmission of audio from the conferencing system 10. Thus, the audio outputs 16 may comprise other devices, such as audio mixers, recorders, transmitters, digital storage devices, processors, etc.

The conferencing system 10 may further include one or more conferencing units 52a-i, which may be organized in one or more conferencing unit chains 50a,b, as seen in FIG. 1. For example, a first conferencing unit chain 50a may comprise five conferencing units 52a,b,c,d,e and a second conferencing unit chain 50b may comprise five conferencing units 52f,g,h,i,j, as seen in FIG. 1. Each chain 50a,b may be connected to the control unit 30 via a connection cable 70a,b. Alternatively, each chain 50a,b may be in communication with the control unit 30 via a wireless connection, or other known connection technique.

The various conferencing units 52 in a system 10 may comprise audio transceiver units which support the functioning of the conferencing system 10 by providing audio input and output capabilities remote from the control unit 30. For example, the conferencing units 52 may include one or more microphones for capturing audio, such as a human speaking, at the location of the conferencing unit 52, and passing such audio to the control unit 30. The control unit 30 may receive the audio transmitted by the conferencing units 52, as well as any audio received from the audio inputs 12, and process such audio for transmission to the audio outputs 16 for further transmission, storage, recordation, or processing. Thus, in certain embodiments, the conferencing units 52 act as input/output devices for audio (and optionally other media) of the system 10.

The conferencing units 52 may further include loudspeakers for transmitting audio, for example to a user of one of the conferencing units 52 located proximate the unit 52. Thus, audio captured by the control unit 30 from other conferencing units 52, or other components of the system 10, such as the audio inputs 12, may further be transmitted to users via loudspeakers inside or coupled to the conferencing units 52. Thus, the conferencing units 52 may be both audio input and audio output devices. In other embodiments, the conferencing units 52 may include other features, such as transmitters, receivers, and repeaters. Thus, the conferencing units 52 of the system 10 may comprises a variety of devices, including microphones, microphone units, wireless microphone systems, loudspeakers, etc. Moreover, the conferencing units 52 may be one or more of a variety of conferencing equipment configurations, and may comprise a microphone unit, an interpreter station, an extension unit, a power inserter, a digital transmitter or a repeater. The conferencing units 52 may further comprise video capabilities including cameras and displays to capture and transmit video and graphical information.

The conferencing system 10 may further include a network 22 comprising a variety of networked devices which interact with the other components of the system 10, for example through the control unit 30. For example, the network 22 may include a router or switch 24, which may be a wired and/or wireless router 24 as depicted in FIG. 1, for transmission, routing and delivery of data and information, including digital information, in an embodiment. The digital information may include the audio-visual content on the system 10, such as the audio captured by the audio inputs 12 or at the conferencing units 52. The network 22 may further include one or more computers 26, which may be in communication with the control unit 30 of the system 10 either directly, or through interconnection over the network 22 as shown. The computer 26 may further support the operation of the system 10 and provide control and set up functionality for one or more components of the system 10 as shown in FIG. 1.

One or more remote control 28 devices may be employed as part of the network 22 to provide inputs, outputs or control features to the conferencing system 10. For example, a mobile or tablet device may act as a remote control 28 to adjust parameters of the conferencing system 10. Audio parameters such as volume, balance, tone, muting, etc. may be controlled or activated over the network 22, for example via the remote control 28 devices or the computer 26. Similarly, other configurations of the conferencing system 10 can be controlled by the remote control 28 devices or the computer 26, such as activation and deactivation of the conferencing units 52, configuration of the conferencing unit chains 50, and other parameters of the components of the system 10 as described herein. Moreover, the remote control 28 devices and/or the computer 26 may be used to record audio visual content transmitted over the conferencing system 10, or to process, transmit, receive, or alter such content. The components of the network 22 may further place the conferencing system 10 in communication with other remote devices, for example over telecommunication lines, internet connections, local area networks, wide area networks, transmitters, receivers and transceivers.

The conferencing system 10 supports audio visual communications between and amongst a plurality of individuals, for example, in a conference room, a corporate board room, a meeting hall, or governmental body. Multiple users of the conferencing system 10 can interact using the conferencing unit chains 50, the audio inputs 12, and the audio outputs 16 to capture, transmit, play and record audio and visual signals for purposes of communication. In an embodiment, the conferencing system 10 may be used to capture audio from a plurality of human speakers engaged in a dialogue and transmit such audio to local loudspeakers for sound reinforcement, or externally to other audiences or listeners. In other embodiments, other applications of the conferencing system 10 may be utilized.

Figure 2A:
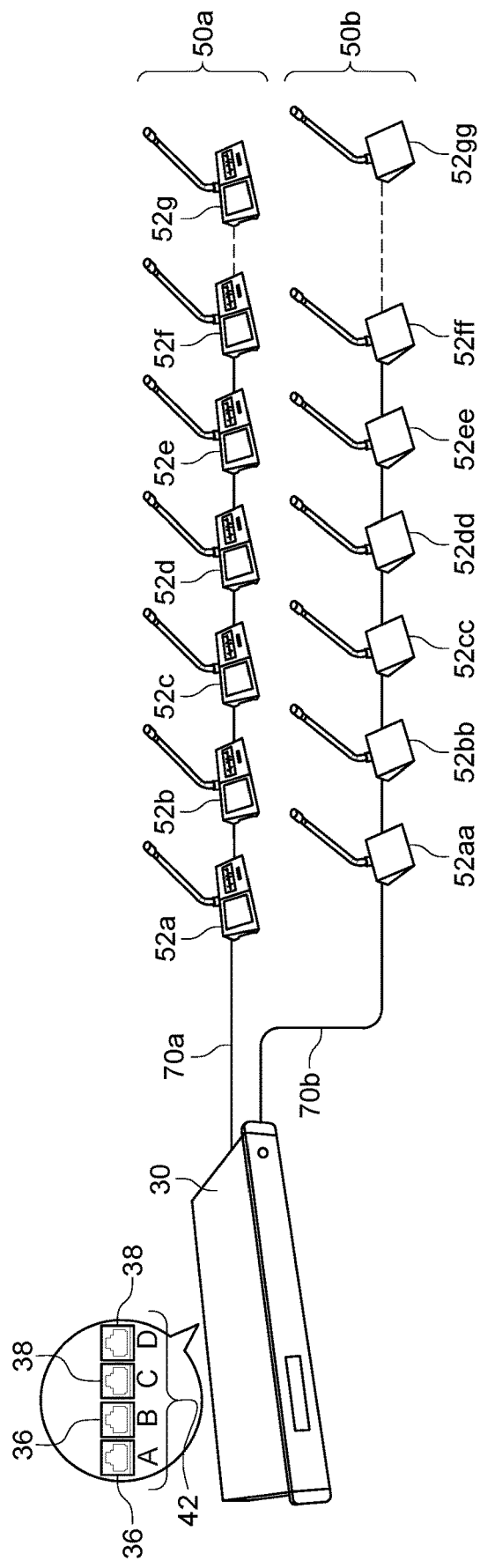
FIG. 2A is a diagram of a control unit having two chains of conferencing units connected thereto, in accordance with some embodiments.
Figure 2B:
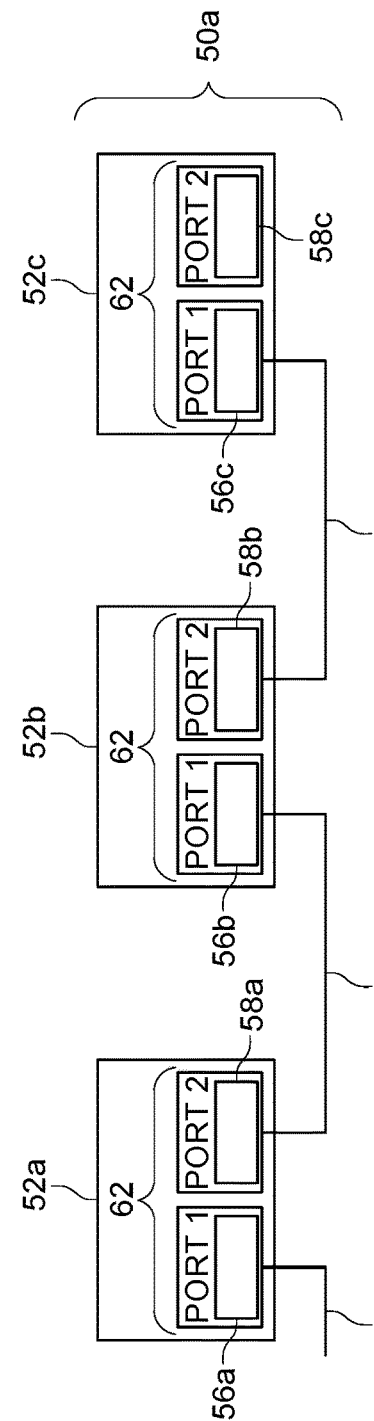
FIG. 2B is a schematic diagram illustrating exemplary ports and connections thereto to form chains of conferencing units, such as those shown in FIG. 2A, in accordance with some embodiments.

In some embodiments, the control unit 30, among other functions, serves to provide or otherwise facilitate power to the other components of the system 10, such as the conferencing units 52. Thus, as seen in FIGS. 2A and 2B, the control unit 30 of the conferencing system 10 includes components and functionality which support sensing and adjustment of one or more power characteristics of the system 10. Thus, the control unit 30 includes a data bus 32 (seen in FIG. 3) for sending and receiving control data to and from interconnected devices, such as the conferencing units 52, the audio inputs 12, the audio outputs 16 and the network 22. In an embodiment, the data bus 32 is in communication with one or more input ports 36 and output ports 38 through which other components of the conferencing system 10 are interfaced.

The control unit 30 further includes a power bus 34 (seen in FIG. 3) for transmitting power to connected components for purposes of powering them in their functional modes. The power bus 34 may be further connected to the output ports 38 of the control unit 30 for transmitting power to such connected devices, such as the conferencing units 52. Both the input ports 36 and output ports 38 may be in communication with a variety of connector jacks 42, for connecting other components of the system 10. In an embodiment, the connector jacks 42 may be RJ45 jacks for supporting a wired connection therewith. However, in other embodiments, other forms of connector jacks 42 may be utilized. Complimentary cabling can be utilized with the connector jacks 42, such as Ethernet cables which are terminated in appropriate connectors for insertion into the connector jacks 42. In some embodiments, the cables 70 may be Ethernet cables. In alternative embodiments, other cabling types may be utilized. The control unit 30 may further include an onboard processor 44 and a sensor 40 for performing the control functions of the system 10 as described further herein. The control unit 30 may further include a sensor 40 (seen in FIG. 3) for sensing power characteristics at the output ports 38 of the control unit 30, and using such information for adjusting, regulating, or changing such power characteristics, as described herein.

The system 10 further includes one or more conferencing units 52*a-g*, 52*aa-gg*, which are in communication with the control unit 30. Each conferencing unit 52 may include an input port 56 and output port 58, and one or more connector jacks 62 (as seen in FIG. 2B). The conferencing units 52 may further include a processor 54 and a sensor 60 for performing control functions as described herein. In an embodiment, the conferencing units 52 are connected in one or more conferencing unit chains 50*a,b*, in which the units 52*a-g*, 52*aa-gg* on each chain 50*a,b* are daisy chained together in a serial fashion, with each chain 50*a,b* connected to the control unit 30. For example, one or more connection cables 70*a,b* may be used to connect the first conferencing unit 52*a*,52*aa* in each chain 50*a,b* with the control unit 30, but interconnecting the input ports 36 and the output ports 38 of the control unit 30 (via the connector jacks 42) to the input ports 56 of the conferencing units 52*a*,52*aa* (via the connector jacks 62). In an embodiment, the input ports 56 and the output ports 58 of the conferencing unit 52 may utilize the same form of connector jack 62, and may be interchangeable with one another. That is, upstream and downstream connections of the chain 50 may be made via either the input ports 56 or the output ports 58 via either of the connector jacks 62 in communication therewith, since both ports 56,58 are in communication with monitoring circuitry, such as the sensors 60 of the conferencing unit 52.

Thus, the conferencing units 52*a-g* on a particular chain 50*a* may be interconnected in a cascading or daisy chained fashion as depicted in FIGS. 2A and 2B. In this connection scheme, a first unit 52*a* is connected to the control unit 30, while a last conferencing unit 52*g* forms the end of the chain 50*a*. The connections between an exemplary portion of a chain 50*a* including conferencing units 52*a-c* is described in greater detail with reference to FIG. 2B. The connections shown in FIG. 2B may be extended to conferencing units 52*a-g* of the chain 50*a*. In FIG. 2B, the interconnections permit power for the conferencing units 52*a-c* to be transmitted over the connection cables 70, so as to provide power to each unit 52*a-c* in the chain 50*a*. In this way, the control unit 30 acts as a power hub for the conferencing units 52 connected to it, by delivering power to the units 52 over the connection cables 70 and to the input ports 56 thereon. In some embodiments, the control unit 30 may facilitate delivery of power by other power devices on the power bus, such as external power sources, to the conferencing units 52*a-c*. As described herein, the control unit 30 may use data from the conferencing system 10 to control one or more characteristics of the power being delivered to each conferencing unit 52 to which it is connected.

Moreover, in an embodiment, the connection cables 70 may further comprise a data communication pathway for exchange of data between the connected conferencing units 52 and the control unit 30. For example, each conferencing unit 52 may use an onboard sensor 60 to monitor one or more power characteristics of the power being delivered to the unit 52 via the input port 56, may process that data via an onboard processor 54, and may transmit that data to the control unit 30 via a data connection. In some embodiments, the data connection is a wired connection, for example, over the connection cables 70 connecting the control unit 30 and the conferencing units 52. Thus, in an embodiment, the connection cables 70 may be cables which support delivery of power from the control unit 30 to the connected conferencing units 52, as well as support transfer of data between the control unit 30 and the conferencing units 52. Such embodiments may utilize, for example, power over Ethernet ("PoE") configurations, or other configurations which support simultaneous data transfer and power delivery. In other embodiments, the data transfer may occur over a connection separate from the power deliver connection. In yet other embodiments, the data transfer between the conferencing units 52 and the control unit 30 may be wireless. Thus, while the sensors 60 of the conferencing units 52 are configured to send power data (data relative to the power characteristics of power actually received at the unit) back to the control unit 30, such power data may be transferred in any number of ways, including wired (either via the same or different cabling or connectors over which the power is delivered), and wireless (either directly, or via intermediate devices, such as computers, mobile devices, tablets, processors, routers, switches, etc.) Accordingly, in some embodiments, the sensors 60 determine the data which may be provided to the control unit by other means, components, or devices.

It should be noted that the term "sensor" as used in this specification contemplates any means known in the art for measuring, sensing or determining one or more power characteristics at the ports or at other points within the power bus or conferencing unit circuitry to effectuate the determination of data to be sent to or otherwise obtained by the control unit 30. The sensor may comprise hardware such as circuitry, firmware and/or software. In an embodiment, the sensor 40 of the control unit 30 may comprise a series sense resistor with one or more analog-to-digital converters ("ADCs") measuring voltage drop across the resistor (which in turn also provides information as to current flowing there through), as well as output voltage. In an embodiment, the sensor 60 on the conferencing unit 52 may comprise an ADC which measures immediate node voltage at the unit 52, for example, at the input port 56. In other embodiments, other combinations of devices may be used to create sensors 40,60 which measure input and output voltages, currents and other power characteristics in a variety of ways.

As seen in FIG. 2B, a chain 50a of connected conferencing units 52a,b,c may be formed by serially connecting the units 52a,b,c as depicted. Thus, using connection cables 70, the input port 56a of a first unit 52a may be connected to the input ports 36 and the output ports 38 of the control unit 30 via the connector jacks 42 thereon. Thus, the first unit 52a may receive power from the control unit (not shown) over a first connection cable 70a. An output port 58a of the first unit 52a may be connected to the input port 56b of a second conferencing unit 52b, via a second connection cable 70b, so as to permit power from the control unit to be cascaded from the first unit 52a to the second unit 52b, while simultaneously providing a data path for power data sensed at the second unit 52b to be passed upstream back to the control unit 30. Similarly, an output port 58b of the second unit 52b may be connected to an input port 56c of a third conferencing unit 52c, by a third connection cable 70c. This connection again permits further cascading of power delivered to the units 52a,b,c by the control unit 30, and transmission of sensed power data at the third unit 52c, to be returned to the control unit 30. In this way, the conferencing units 52a,b,c on a chain 50a may be cascaded or daisy chained to establish communication with the power bus to facilitate distribution of power to the various units 52a,b,c from the control unit 30, and return of power data sensed at the units 52a,b,c back to the control unit 30.

In an embodiment, the control unit 30 delivers power to the first connected conferencing unit 52a in a chain 50a by transmitting power from its power bus 34, through its output port 38 (via an appropriate connector jack 42 in communication therewith), over a connection cable 70 and to the input port 56a of the first unit 52a (via an appropriate connector jack 62 on the unit 52a). The power delivered to the unit 52a has certain power characteristics, which for example, may include power, voltage, current, efficiency, load regulation, drift, dynamic response and other characteristics. A sensor 60 (shown in FIG. 3) of the unit 52a is in communication with the input port 56 so as to detect and monitor the power characteristics of the delivered power, and to communicate those characteristics to a processor 54 (shown in FIG. 3) of the conferencing unit 52. The processor 54, in turn, may use the data connection to transmit system diagnostics back to the control unit 30. In an embodiment, the system diagnostics may include information about the power characteristics of the delivered power to the conferencing unit 52. The processor 44 of the control unit 30, in turn, can use this data feedback to adjust the configuration of the conferencing units 52, which in an embodiment, may include adjusting one or more power characteristics of the power being delivered to the conferencing units 52 connected to it. In this way, the components of the conferencing units 52 and the control unit 30 support a feedback and data transfer system which aids in formation of a control loop for power delivery, as described in greater detail with reference to FIG. 3.

Figure 3:
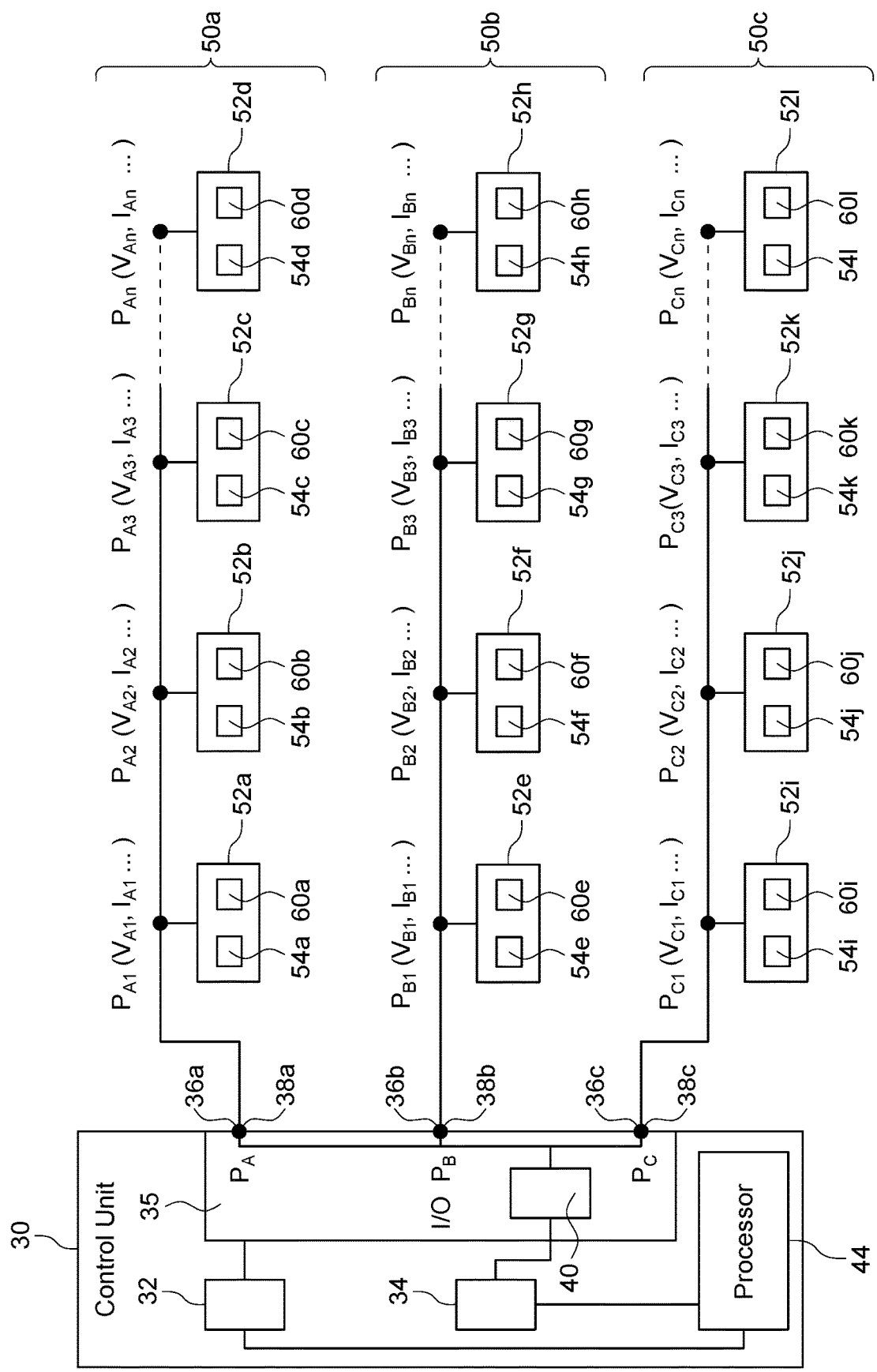
FIG. 3 is a schematic diagram illustrating an exemplary system having a control unit having three chains of conferencing units connected thereto and various points of power characteristic sensing on a power bus within the system for communication to the control unit via a data bus, in accordance with some embodiments.

Turning to FIG. 3, a block diagram of a conferencing system 10 according to an embodiment of the present invention is depicted. The system 10 includes a control unit 30, and a plurality of conferencing units 52 connected to the control unit 30, arranged in one or more conferencing unit chains 50a,b,c, in a fashion similar to the embodiments depicted in the other figures. The control unit 30 includes a data bus 32, a power bus 34, and a processor 44 in communication with the data bus 32 and the power bus 34. The control unit 30 further includes an input/output block 35 that comprises input ports 36 and output ports 38, as described in relation to FIGS. 1 and 2. The output ports 38 deliver downstream power ($P_A$, $P_B$, and $P_C$) to the connected conferencing units 52, which in an embodiment are delivered via the output ports 38 to one or more connector jacks 42 on the control unit 30. The control unit 30 further comprises one or more sensors 40 which detect characteristics of the power ($P_A$, $P_B$, and $P_C$) output from the output ports 38. Thus, the control unit 30 has information about power at its point of output (the output ports 38 of the control unit 30) as well as its point of delivery (the input ports 56 of the various conferencing units 52 in the system). The control unit 30 uses this data to control the characteristics of power at its output ports 38 to ensure that power received at the conferencing units 52 has appropriate characteristics for each unit 52.

In a first conferencing unit chain 50a, a series of conferencing units 52a,b,c,d are connected in a cascading fashion as described herein. A first unit 52a on the chain 50a is connected to a first output port 38a on the control unit 30 via a connection cable 70. The control unit 30 delivers a first power ($P_A$) having certain power characteristics (as described earlier herein) to the first unit 52a of the first chain 50a. Through the cascading connection, the first conferencing unit 52a passes the first power ($P_A$) to the next conferencing unit 52b in the chain 50a, which in turn passes it to the next conferencing unit 52c in the chain 50a, which in turn passes it to a final, or "nth" conferencing unit 52d in the chain 50a. In this way, the control unit 30 delivers power to all of the conferencing units 52a-d in the chain 50a.

As the first power ($P_A$) is cascaded down the conferencing units 52a-d in the first chain 50a, various factors contribute to a loss or degradation of various characteristics of such power ($P_A$) further down the chain 50a. Resistance in the components of the system 10, losses in the connection cables 70, heat generated in the conferencing units 52a-d and other components and factors will cause the power ($P_A$) to degrade as it is passed along the cascading chain 50a. These losses may result in power received at a downstream conferencing unit, for example unit 52c, being degraded as compared to power received at an upstream conferencing unit, for example unit 52a. Thus, downstream conferencing units 52 on a chain 50a may have somewhat degraded power as compared to their upstream counterparts, which may be in the form of decreased power, decreased voltage, decreased current, decreased efficiency, differentiated load regulation, more drift, less dynamic response, or other change in power characteristic.

The system 10, therefore, includes features to monitor power characteristics of the delivered power ($P_A$) downstream at the connected conferencing units 52a-d, and return diagnostic information from the units 52a-d back to the control unit 30, as described herein. The system 10 may optionally include functionality which allows adjustment of the delivered power ($P_A$) to compensate for deficiencies or degradations in power characteristics detected at the various conferencing units 52a-d. For example, a sensor 60 and a processor 54 of each conference unit 52a-d in the chain 50a monitor characteristics of the power ($P_A$) delivered to such unit 52a-d, and report the status of those characteristics back to the control unit 30. In an embodiment, the sensor 60 is in communication with an input port 56 of the conferencing unit 52, and monitors power characteristics of power delivered to the unit 52. The sensor 60 relays information about the power characteristics back to the control unit 30.

Thus, for example, a first conferencing unit 52a on the first chain 50a may use its sensor 60 to detect a characteristic profile ($P_{A1}$) of power delivered to the unit 52a. The detected power characteristic ($P_{A1}$) may be any one or more of available characteristics of the delivered power, such as its voltage ($V_{A1}$), current ($I_{A1}$), etc. Similarly, a second conferencing unit 52b on the first chain 50a may use its sensor 60 to detect a characteristic profile ($P_{A2}$) of power delivered to the unit 52b. This may continue to a last conferencing unit 52d on the chain 50a, which uses its sensor 60 to detect a characteristic profile ($P_{An}$) of power delivered to the unit 50d. All of the units 52a-d use their processors 54 to send data and information about the detected power characteristic profiles ($P_{A1}$, $P_{A2}$, $P_{A3}$, $P_{An}$) back to the control unit 30 (via the data feedback channel described earlier herein).

As seen in FIG. 3, the processor 44 and sensor 40 of the control unit 30 monitor various characteristics of the first power ($P_A$) dispatched to be delivered to the conferencing units 52a-d on the first chain 50a. For example, the sensor 40 may monitor power characteristics of the first power ($P_A$) at the first output port 38a, and report those characteristics to the processor 44. Thus, the control unit 30 tracks data on dispatched power ($P_A$) at the respective output port 38a, as well as receives data on the received power ($P_{A1}$, $P_{A2}$, $P_{A3}$, $P_{An}$) at the input ports 56 and output ports 58 of the various connected conferencing units 52a-d. This data allows the processor 44 of the control unit 30 to perform various control functions.

For example, using the data collected from the various connected conferencing units 52a-d, the control unit 30 may process the data (via the processor 44) to determine a connection order or configuration of the conferencing unit chains 50a,b,c and the conferencing units 52 on each chain 50a,b,c. By having, for example, data on the power characteristics received at the units 52a-d on the first chain 50a, the control unit 30 can determine that the first unit 52a is first in the chain 50a, the second unit 52b is second in the chain 50a, the third unit 52c is third in the chain 50a, and the last unit 52d is last, or "nth" in the chain 50a. Having information relative to the connection order and configuration of the connected units 52 and chains 50 allows the control unit 30 to make changes in various aspects of the delivered power ($P_A$, $P_B$, $P_C$), as is necessary to maintain the system 10 in a desired working configuration.

In another application, for example, a characteristic profile of the last unit 52d in the chain 50a can be monitored and analyzed to determine if sufficiently desirable power characteristics exist to support the addition of another unit 52 to that chain 50a, so as to expand the chain 50a. The control unit 30 may monitor the characteristic profile of power delivered to the last or "nth" unit 52d to determine whether appropriate conditions exist to add a unit 52 to the chain 50a. For example, if the conferencing unit 52 to be added requires a certain voltage, current, or other power characteristic, the control unit 30 may monitor the conditions of that power characteristic at the end of the chain 50a to determine whether the new unit 52 can be successfully added. If the power characteristic is not favorable (for example, the voltage is not high enough to support addition of another unit 52 to the chain 50a), the control unit 30 can change the power characteristics of the power delivered to the chain 50a ($P_A$ in this case), such that the new additional unit 52 can be added to the chain 50a.

This capability supports easy and efficient construction and expansion of the system 10, by providing real time data to installers of the system 10, such as field technicians deploying the system 10, or maintaining, servicing or otherwise working on the system 10. For example, if a field installer wishes to expand a system 10 by adding one or more conferencing units 52 to a particular chain 50, he or she may interface with the system 10 to gather power characteristic information about the system 10 components in real time. For example, using a computer, tablet, mobile device or other computing device, an installer can connect to the control unit 30, via the network 22, and access power characteristic data. Through such connection, the installer may learn the current output characteristics of the control unit 30 as well as the received power characteristics at the various conferencing units 52. Using that information, the installer can determine whether additional units 52 can be added to a chain 50, and make any necessary adjustments to the output power characteristics required to support such additions. If the received power characteristics at the end of the chain 50 are insufficient to support addition of another conferencing unit 52, for example, the installer can change the power characteristics at the control unit 30 accordingly (increasing the voltage, or current, for example, as necessary). With the change implemented, the installer can further monitor the changes in power characteristics delivered to the last unit 52 in the chain 50, and once he or she verifies that the changes are sufficient to support the additional unit(s) 52, they can be installed.

In an embodiment, the system 10 allows an installer of the system 10 to optimize each chain 50 of conferencing units 52 using the system diagnostic information reported back to the control unit 30 by each conferencing unit 52. In alternative embodiments of the system 10, since the chains 50a-c are independent of one another, the control unit 30 may optionally optimize the power delivered to each chain 50a-c based on the number of conferencing units 52 connected on each chain 50a-c, and the power characteristics ($P_{A1}$-$P_{An}$, $P_{B1}$-$P_{Bn}$, $P_{C1}$-$P_{Cn}$) of the units 52 on the chains 50a-c. For example, a power ($P_A$) delivered to a first chain 50a may be different in characteristics than a power ($P_B$) delivered on a second chain 50b, as may be needed by the units 52 on the chains 50a,b. In this way, the control unit 30 can customize and dispatch the most efficient power profiles ($P_A$, $P_B$, $P_C$) based on the number and configuration of the units 52 on the chains 50a-c. Using this information, an installer can reconfigure a particular system 10, and connect the various conferencing units 52 in chains 50 that most efficiently utilize the delivered power characteristics (for example, putting higher power devices earlier in the chain and lower power devices later in the chain).

In this way, the components of the systems 10 depicted and described provide a power characteristic control loop such that dispatched power and received power can be sensed, measured, monitored, and adjusted accordingly to optimize performance of the system 10. By collecting and monitoring information about the power characteristics at both dispatch and delivery points, the system 10 can be used to change the power characteristics of dispatched power to achieve desired characteristics at a point of delivery. This feedback and control loop created and enabled by the components of the system 10 allow the conferencing systems 10 of the present invention to be installed, operated, maintained and expanded in manners which preserve efficient use of power.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A conferencing system comprising:
a control unit comprising:
a data bus,
a power bus,
an output port in communication with the power bus, and
a first sensor in communication with the output port capable of sensing one or more power characteristics at the output port; and
a first conferencing unit in communication with the data bus of the control unit, the first conferencing unit comprising:
an input port in communication with the power bus via connection to the output port of the control unit,
an output port in communication with the power bus, and
a second sensor in communication with the output port of the first conferencing unit capable of sensing one or more power characteristics of power output at the output port of the first conferencing unit;
wherein data associated with the one or moreسsensed power characteristics at the output port of the first conferencing unit is capable of being communicated over the data bus to the control unit, and the control unit is configured to determine whether a second conferencing unit can be connected to the output port of the first conferencing unit by processing the one or more sensed power characteristics at the output port of the first conferencing unit.

2. The system of claim 1, wherein the second conferencing unit is in communication with the data bus of the control unit, the second conferencing unit having an input port in communication with the power bus via connection to the output port of the first conferencing unit, an output port in communication with the power bus, and a sensor in communication with the output port of the second conferencing unit capable of sensing one or more power characteristics at the output port of the second conferencing unit;
wherein data associated with the one or more sensed power characteristics at the output port of the second conferencing unit is capable of being communicated over the data bus to the control unit, and
wherein the control unit is further configured to determine whether a third conferencing unit can be added to the conferencing system by processing the one or more sensed power characteristics at the output port of the second conferencing unit.

3. The system of claim 1, wherein each of the output port of the control unit, the input port of the first conferencing unit and the output port of the first conferencing unit are in communication with the data bus.

4. The system of claim 3, wherein each of the output port of the control unit, the input port of the first conferencing unit, and the output port of the first conferencing unit are in communication with a respective connector jack.

5. The system of claim 4, wherein the input port of the first conferencing unit and the output port of the first conferencing unit are interchangeable.

6. The system of claim 3, wherein the output port of the control unit, the input port of the first conferencing unit, and the output port of the first conferencing unit are each in communication with the data bus and the power bus via connection by a cable.

7. The system of claim 1, wherein the data bus is a wireless data bus wirelessly in communication with the first conferencing unit.

8. The system of claim 1, further comprising a wireless router in communication with the control unit and the first conferencing unit.

9. The system of claim 1, wherein the first sensed power characteristics of power output at the output port of the first conferencing unit comprises power, voltage, current, efficiency, load regulation, drift, or dynamic response.

10. The system of claim 1, wherein the first sensor of the control unit and the second sensor of the first conferencing unit each comprise circuitry capable of sensing voltage and current.

11. The system of claim 1, wherein the control unit processes one or more of the one or more sensed power characteristics of power output at the output port of the first conferencing unit and outputs data for presentment to a user.

12. The system of claim 1, wherein the first conferencing unit comprises a microphone, a microphone unit, an interpreter station, a digital transmitter, a speaker, a repeater, an extension unit, or a power inserter.

13. A conferencing system comprising:
a control unit comprising:
a data bus,
a power bus,
an output port in communication with the power bus,
a first sensor in communication with the output port capable of sensing one or more power characteristics at the output port, and
an output interface;
a first conferencing unit in communication with the data bus of the control unit, the first conferencing unit comprising:
an input port in communication with the power bus via connection to the output port of the control unit,
an output port in communication with the power bus, and
a second sensor in communication with the output port of the first conferencing unit capable of sensing one or more power characteristics of power output at the output port of the first conferencing unit; and
a second conferencing unit in communication with the data bus of the control unit, the second conferencing unit comprising:
an input port in communication with the power bus via connection to the output port of the first conferencing unit, an output port in communication with the power bus, and
a third sensor in communication with the output port of the second conferencing unit compable of sensing one or more power characteristics of power output at the output port of the second conferencing unit;
wherein data associated with the one or more sensed power characteristics at the output ports of the first conferencing unit and the second conferencing unit are capable of being communicated over the data bus to the control unit and processed for output to the output interface, and
wherein the control unit is configured to determine whether a third conferencing unit can be connected to the output port of the second conferencing unit by processing the one or more sensed power characteristics at the output port of the second conferencing unit.

14. The system of claim 13, wherein each of the output ports of the control unit, the first conferencing unit and the second conferencing unit are in communication with the data bus.

15. The system of claim 14, wherein each of the output ports of the control unit, the first conferencing unit, and the second conferencing unit, and each of the input ports of the first conferencing unit and the second conferencing unit are in communication with a respective connector jack.

16. The system of claim 15, wherein the input port of the first conferencing unit and the output port of the first conferencing unit are interchangeable.

17. The system of claim 14, wherein each of the output ports of the control unit, the first conferencing unit, and the second conferencing unit are in communication with the data bus and the power bus via connection by a cable between the control unit and the first and the second conferencing units.

18. The system of claim 13, wherein the data bus is a wireless data bus wirelessly in communication with the first conferencing unit and the second conferencing unit.

19. The system of claim 13, further comprising a wireless router in communication with the control unit, the first conferencing unit, and the second conferencing unit.

20. The system of claim 13, wherein the one or more sensed power characteristics of power output at the output port of the first conferencing unit comprise power, voltage, current, efficiency, load regulation, drift, or dynamic response.

21. The system of claim 13, wherein the first sensor of the control unit, the second of the first conferencing unit, and the third sensor of the second conferencing unit each comprises circuitry capable of sensing voltage and current.

22. The system of claim 13, wherein the control unit processes one or more of the one or more sensed power characteristics of power output at the output port of the first conferencing unit and outputs data for presentment to a user.

23. The system of claim 13, wherein the control unit detects an order of connection of the first conferencing unit and the second conferencing unit by processing the one or more sensed power characteristics of power output at the output port of the first conferencing unit and the one or more sensed power characteristics of power output at the output port of the second conferencing unit.

24. The system of claim 13, wherein each of the first conferencing unit and the second conferencing unit comprise of a microphone, a microphone unit, an interpreter station, a digital transmitter, a speaker, a repeater, an extension unit, or a power inserter.

25. A conferencing system comprising:
a control unit comprising:
a data bus,
a power bus,
an output port in communication with the power bus, and
a first sensor in communication with the output port capable of sensing one or more power characteristics at the output port; and
a plurality of conferencing units each in communication with the data bus and each comprising:
an input port, and
an output port in communication with the power bus, each input port being in communication with the power bus via connection to either one of the output port of the control unit or the output port of another one of the plurality of conferencing units, and
a second sensor in communication with the output port of the conferencing unit capable of sensing one or more power characteristics at the output port of the conferencing unit;
wherein data associated with the one or more sensed power characteristics at each of the respective output ports of the plurality of conferencing units are capable of being communicated over the data bus to the control unit, and wherein the control unit is configured to determine whether an additional conferencing unit can be connected to the output port of a last of the plurality of conferecing units connected in series by processing the one or more sensed power characteristics at the output port of the last of the plurality of conferencing units.

26. The system of claim 25, wherein each of the first sensor of the control unit and the second sensor of each of the plurality of conferencing units comprise circuitry capable of sensing voltage and current.

27. The system of claim 25, wherein the control unit processes one or more of the one or more sensed power characteristics of power output at the output port of one or more of the plurality of conferencing units and outputs data for presentment to a user.

28. The system of claim 25, wherein the control unit detects an order of connection of the plurality of conferencing units by processing the one or more power characteristics sensed at the respective output ports of each of the plurality of conferencing units.

29. The system of claim 25, wherein each of the plurality of conferencing units comprise a microphone, a microphone unit, an interpreter station, a digital transmitter, a speaker, a repeater, an extension unit, or a power inserter.

30. The conferencing system of claim 1, wherein the control unit is further configured to modify a power output based on the data associated with the one or more sensed power characteristics of power output at the output port of the first conferencing unit.

31. The conferencing system of claim 13, wherein the control unit is further configured to modify a power output based on the data associated with the one or more sensed power characteristics of power output at the output port of the second conferencing unit.

32. The conferencing system of claim 25, wherein the control unit is further configured to modify a power output based on the data associated with the one or more sensed power characteristics of power output at the output port of the last of the plurality of conferencing units.

* * * * *

UNITED STATES PATENT AND TRADEMARK OFFICE
CERTIFICATE OF CORRECTION

PATENT NO. : 11,301,024 B2
APPLICATION NO. : 15/886579
DATED : April 12, 2022
INVENTOR(S) : William J. Oakley et al.

Page 1 of 1

It is certified that error appears in the above-identified patent and that said Letters Patent is hereby corrected as shown below:

In the Claims

Claim 2, Column 12, Line 36, "and a sensor" should be changed to --and a third sensor--.

Claim 9, Column 13, Line 4, "the first sensed power" should be changed to --the one or more sensed power--.

Claim 13, Column 13, Line 47, "compable" should be changed to --capable--.

Claim 14, Column 13, Line 62, "conferencing unit and" should be changed to --conferencing unit, and--.

Claim 21, Column 14, Line 25, "second of the" should be changed to --second sensor of the--.

Claim 25, Column 14, Line 64, "characteristics at" should be changed to --characteristics of power output at--.

Claim 25, Column 15, Line 7, "conferecing" should be changed to --conferencing--.

Signed and Sealed this
Twenty-first Day of June, 2022

Katherine Kelly Vidal
*Director of the United States Patent and Trademark Office*